US012580475B2

(12) United States Patent
Park et al.

(10) Patent No.: US 12,580,475 B2
(45) Date of Patent: Mar. 17, 2026

(54) SWITCHING CONVERTER EQUIPPED WITH NEGATIVE CURRENT TRACKING CONTROL FUNCTION

(71) Applicants:SILICON MITUS, INC., Seongnam-Si (KR); SILICON-MAGIC SEMICONDUCTOR TECHNOLOGY (HANGZHOU) CO., LTD., Hangzhou City (CN)

(72) Inventors: Beomhee Park, Seoul (KR); Jaihyuk Choi, Gyeonggi-Do (KR); Jung Su Choi, Seoul (KR); Hyeon Deok Jeon, Seoul (KR)

(73) Assignees: Silicon Mitus, Inc., Seongnam-Si (KR); SILICON-MAGIC SEMICONDUCTOR TECHNOLOGY (HANGZHOU) CO., LTD., Hangzhou City (CN)

( * ) Notice: Subject to any disclaimer, the term of this patent is extended or adjusted under 35 U.S.C. 154(b) by 183 days.

(21) Appl. No.: 18/404,674

(22) Filed: Jan. 4, 2024

(65) Prior Publication Data

US 2024/0339922 A1      Oct. 10, 2024

(30) Foreign Application Priority Data

Apr. 7, 2023    (KR) ........................ 10-2023-0045984

(51) Int. Cl.
*H02M 1/08* (2006.01)
*H02M 3/157* (2006.01)
*H02M 3/158* (2006.01)

(52) U.S. Cl.
CPC ........... *H02M 1/083* (2013.01); *H02M 3/157* (2013.01); *H02M 3/158* (2013.01)

(58) Field of Classification Search
CPC ....... H02M 1/083; H02M 3/157; H02M 3/158
See application file for complete search history.

(56) References Cited

U.S. PATENT DOCUMENTS

| | | | |
|---|---|---|---|
| 2008/0246455 A1* | 10/2008 | Chu | .................... H02M 3/1588 323/283 |
| 2012/0235653 A1* | 9/2012 | Chen | .................... H02M 3/1588 323/271 |

(Continued)

FOREIGN PATENT DOCUMENTS

KR        102244444 B1     4/2021

*Primary Examiner* — Rafael O De Leon Domenech
(74) *Attorney, Agent, or Firm* — Osha Bergman Watanabe & Burton LLP

(57) ABSTRACT

The switching converter equipped with negative current tracking control includes a switching transistor whose drain is connected to an input power supply, a rectifying transistor whose drain is connected to a source of the switching transistor and whose source is connected to a ground, an inductor having one end connected to the source of the switching transistor and the drain of the rectifying transistor, an output capacitor having a first end connected to the other end of the inductor and a second end connected to a ground, a PWM controller that outputs a PWM control signal to a gate of the switching transistor and a gate of the rectifying transistor, a zero current detector that detects zero crossing of an inductor current flowing through the inductor, and a negative current tracking controller that variably adjusts an offset of the zero current detector.

9 Claims, 10 Drawing Sheets

(56) References Cited

U.S. PATENT DOCUMENTS

| | | | |
|---|---|---|---|
| 2014/0191744 A1* | 7/2014 | Choi ..................... | H02M 3/158 |
| | | | 323/283 |
| 2015/0301092 A1* | 10/2015 | Michal ................ | H02M 3/1588 |
| | | | 324/120 |
| 2022/0255435 A1* | 8/2022 | Yoon ..................... | H02J 7/0063 |

* cited by examiner

1:Switch turn-on
2:Rectifier turn-on
3:Switch body diode turn-on

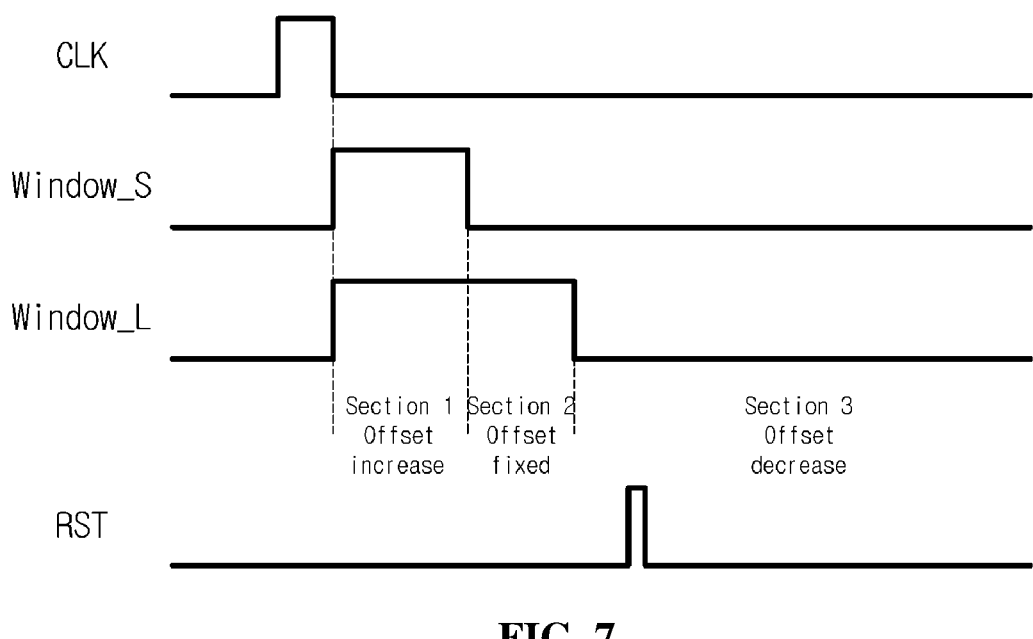
FIG. 7
| $I_L$ | RST generation section | | |
|---|---|---|---|
| | Section 1 | Section 2 | Section 3 |
| Peak current | fixed ($t_{min-on}$) | determined by PWM | determined by PWM |
| Neg. current | increase | fixed | decrease |
FIG. 8
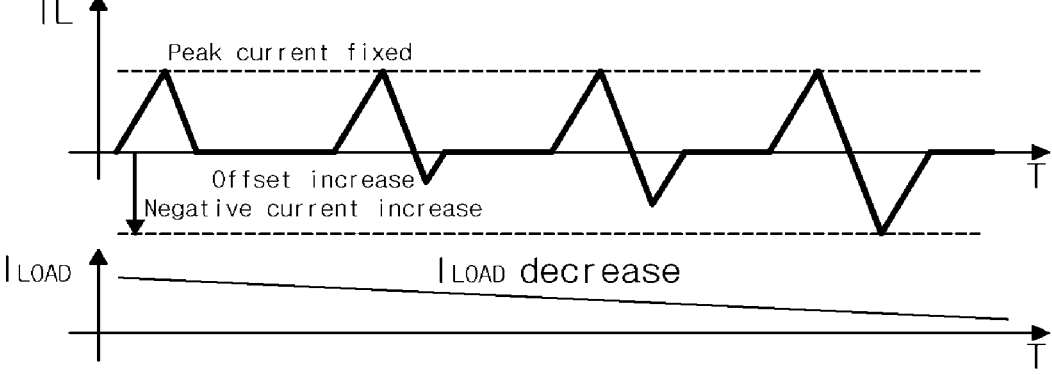
FIG. 9

SWITCHING CONVERTER EQUIPPED WITH NEGATIVE CURRENT TRACKING CONTROL FUNCTION

CROSS-REFERENCE TO RELATED APPLICATION

This application claims priority to Korean Patent Application No. 10-2023-0045984 filed on Apr. 7, 2023 and all the benefits accruing therefrom under 35 U.S.C. § 119, the contents of which are incorporated by reference in their entirety.

BACKGROUND

The present disclosure relates to a switching converter equipped with a negative current tracking control function. More specifically, the present disclosure relates to a switching converter equipped with a negative current tracking control function that improves the efficiency thereof by allowing negative inductor current and effectively controlling and minimizing the negative inductor current required for regulation in no load and light load sections for a discontinuous conduction mode (DCM) driving operation of a buck-type or boost-type synchronous switching converter.

Generally, when driving in the no load and light load regions of a switching converter is required, a pulse skip method or a discontinuous conduction mode (DCM) method under which the switching converter operates by allowing a fixed negative inductor current is used in order to maintain regulation.

In the case of the pulse skip method, it is difficult to use for applications that are sensitive to output ripple due to the deterioration of transient response characteristics.

Further, in the case of the DCM method that allows the fixed negative inductor current, a negative inductor current more than required may be generated depending on an input/output voltage, and the efficiency of the converter decreases due to an increase in inductor current ripple caused by the generation of such a negative inductor current.

CITATION LIST

Patent Literature

PTL 1: Registered patent publication No. 10-2244444 (Registration date: Apr. 20, 2021, Title: Zero current detector)

SUMMARY

One of more embodiments of the present disclosure provide a switching converter equipped with a negative current tracking control function that improves the efficiency of the switching converter by allowing negative inductor current and effectively controlling and minimizing the negative inductor current required for regulation in no load and light load sections for the discontinuous conduction mode (DCM) driving operation of the switching converter.

Further, one of more embodiments of the present disclosure provide a switching converter equipped with a negative current tracking control function that improves efficiency reduction, which is a disadvantage of the fixed negative inductor current DCM method, in applications sensitive to output ripple where the pulse skip function cannot be used.

Further, one of more embodiments of the present disclosure provide a switching converter equipped with a negative current tracking control function that decreases the inductor current ripple by applying a negative inductor current tracking control function that allows the minimum negative inductor current required for the DCM operation depending on the input/output voltage and improves the efficiency of the overall switching converter system.

In accordance with one of more embodiments of the present disclosure, there is provided a switching converter, the switching converter being a buck-type switching converter equipped with a negative current tracking control function, including a switching transistor whose drain is connected to an input power supply, a rectifying transistor whose drain is connected to a source of the switching transistor and whose source is connected to a ground, an inductor having one end connected to the source of the switching transistor and the drain of the rectifying transistor, an output capacitor having a first end connected to an other end of the inductor and a second end connected to ground, a PWM controller that outputs a PWM control signal to a gate of the switching transistor and a gate of the rectifying transistor, a zero current detector that detects zero crossing of an inductor current flowing through the inductor, and a negative current tracking controller that variably adjusts an offset of the zero current detector.

In accordance with one of more embodiments of the present disclosure, there is provided a switching converter, the switching converter being a boost-type switching converter equipped with a negative current tracking control function, including an inductor having one end connected to an input power supply, a switching transistor whose drain is connected to an other end of the inductor and whose source is connected to a ground, a rectifying transistor whose drain is connected to the drain of the switching transistor and the other end of the inductor, an output capacitor having a first end connected to a source of the rectifier transistor and a second end connected to ground, a PWM controller that outputs a PWM control signal to a gate of the switching transistor and a gate of the rectifying transistor, a zero current detector that detects zero crossing of an inductor current flowing through the inductor, and a negative current tracking controller that variably adjusts an offset of the zero current detector.

In the switching converter equipped with the negative current tracking control function according to the first and second aspects of the present disclosure, the negative current tracking controller may include a first pulse generator that generates a first pulse having a first time window according to an input clock, a second pulse generator that generates a second pulse having a second time window larger than the first time window according to the input clock, and a timing controller that tracks the negative inductor current by determining whether or not to increase or decrease an offset of the negative inductor current flowing through the inductor by monitoring a reset signal input from the PWM controller, comparing the first time window of the first pulse and the second time window of the second pulse, and variably changing an offset applied to an inverting terminal of the zero current detector.

In the switching converter equipped with the negative current tracking control function according to the one of more embodiments of the present disclosure, the timing controller may increase the offset applied to the inverting terminal of the zero current detector during a first section corresponding to the first time window.

In the switching converter equipped with the negative current tracking control function according to the first and second exemplary embodiments of the present disclosure, during the first section corresponding to the first time window, a peak current of the inductor may be fixed and the negative inductor current may increase.

In the switching converter equipped with the negative current tracking control function according to one of more embodiments of the present disclosure, the timing controller may fix the offset applied to the inverting terminal of the zero current detector during a second section corresponding to the second time window.

In the switching converter equipped with the negative current tracking control function according to one of more embodiments of the present disclosure, during the second section corresponding to the second time window, a peak current of the inductor may be determined by PWM by the PWM controller, and the negative inductor current may be fixed.

In the switching converter equipped with the negative current tracking control function according to one of more embodiments of the present disclosure, the timing controller may decrease the offset applied to the inverting terminal of the zero current detector during a third section after the second time window.

In the switching converter equipped with the negative current tracking control function according to one of more embodiments of the present disclosure, during the third section, a peak current of the inductor may be determined by the PWM by the PWM controller, and the negative inductor current decreases.

According to one of more embodiments of the present disclosure, it is possible to improve efficiency of the switching converter by allowing negative inductor current and effectively controlling and minimizing the negative inductor current required for regulation in the no load and light load sections for the discontinuous conduction mode (DCM) driving operation of the switching converter.

Further, it is possible to improve the efficiency reduction, which is a disadvantage of the fixed negative inductor current DCM method, in applications sensitive to output ripple where the pulse skip function cannot be used.

Furthermore, it is possible to decrease inductor current ripple by applying the negative inductor current tracking control function that allows the minimum negative inductor current required for the DCM operation depending on the input/output voltage and improving the efficiency of the overall switching converter system.

BRIEF DESCRIPTION OF THE DRAWINGS

Exemplary embodiments can be understood in more detail from the following description taken in conjunction with the accompanying drawings, in which:

FIGS. 7 and 8 are diagrams for describing an operation method of the negative current tracking controller in the exemplary embodiments of the present disclosure;

FIGS. 9 to 11 are diagrams for describing a correlation between an inductor current and a load current according to negative current tracking control for each operation section in the exemplary embodiments of the present disclosure;

DETAILED DESCRIPTION OF EMBODIMENTS

Figure 1:
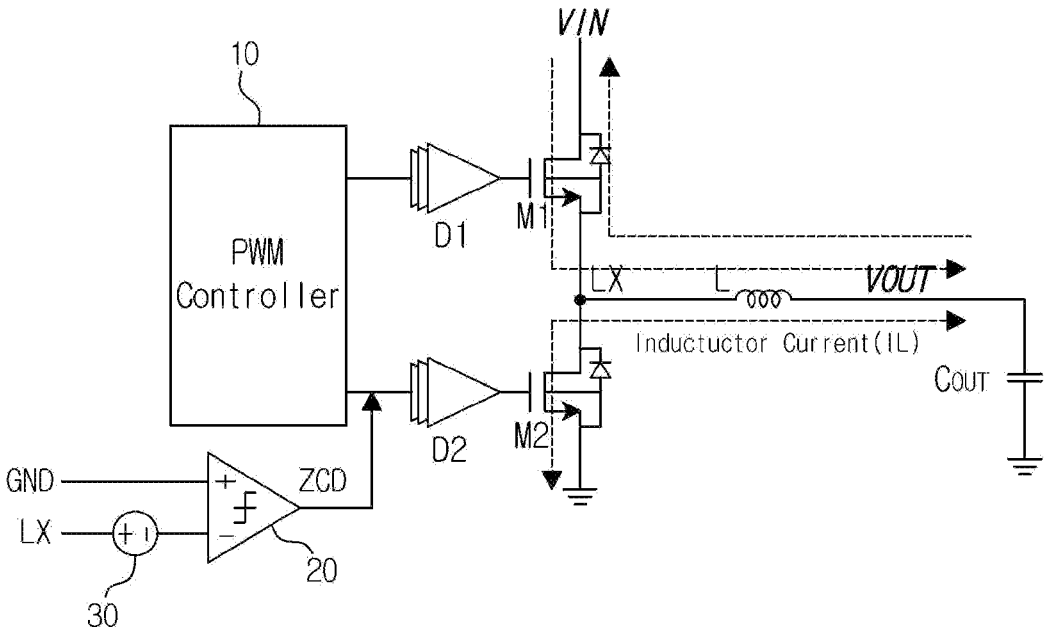
FIG. 1 is a diagram illustrating a general buck-type synchronous switching converter.

Specific structural or functional descriptions of the embodiments according to the concept of the present disclosure disclosed in this specification are merely illustrative for the purpose of describing the embodiments according to the concept of the present disclosure. The embodiments according to the concept of the present disclosure may be implemented in various forms and are not limited to the embodiments described in this specification.

Since the embodiments according to the concept of the present disclosure may be subjected to various changes and have various forms, the embodiments will be illustrated in the drawings and described in detail in this specification. However, this is not intended to limit the embodiments according to the concept of the present disclosure to specific disclosed forms, and the embodiments includes all changes, equivalents, or substitutes included in the spirit and technical scope of the present disclosure.

Unless otherwise defined, all terms used herein, including technical or scientific terms, have the same meaning as commonly understood by a person of ordinary skill in the technical field to which the present disclosure pertains. Terms as defined in commonly used dictionaries should be interpreted as having a meaning consistent with the meaning in the context of the related technology, and should not be interpreted in an idealized or overly formal sense unless clearly defined in this specification.

In the following, one or more embodiments of the present disclosure will be described in detail with reference to the accompanying drawings.

Figure 3:
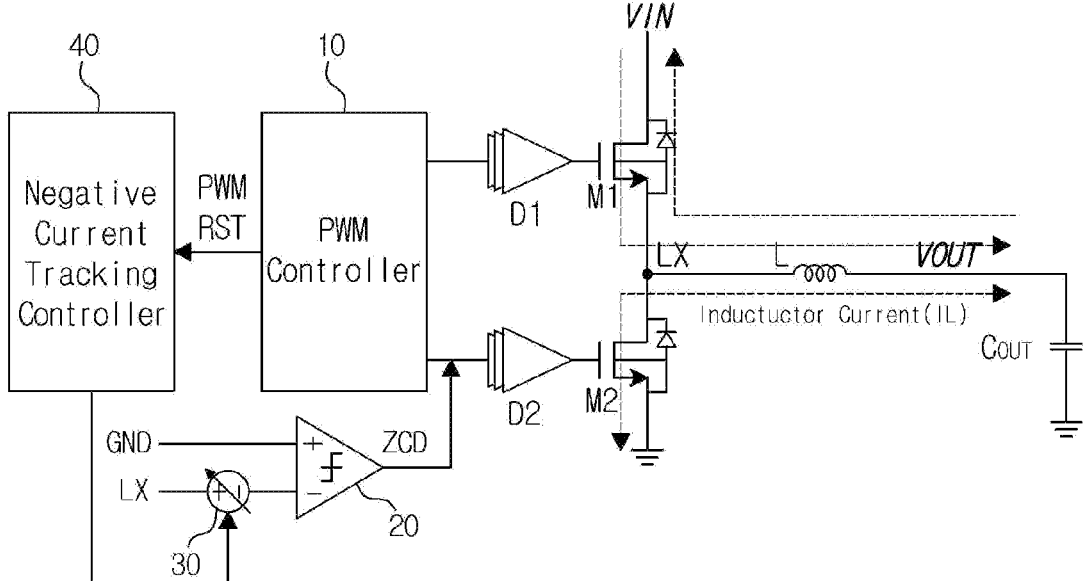
FIG. 3 is a diagram illustrating a buck-type switching converter equipped with a negative current tracking control function in accordance with a first exemplary embodiment of the present disclosure.
Figure 5:
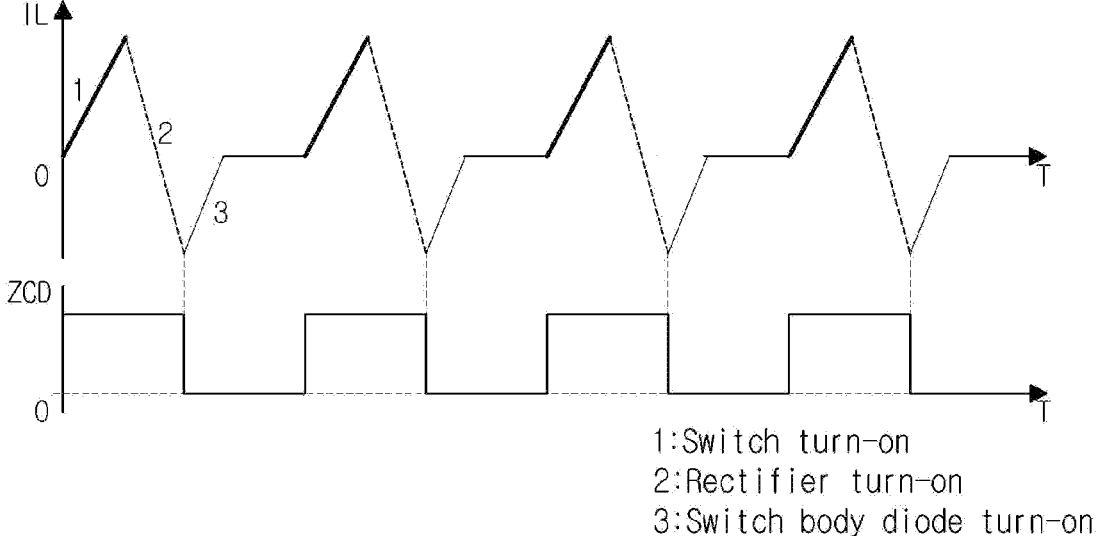
FIG. 5 is a diagram for describing the principle of inductor current and zero current detection of a switching converter.
Figure 6:
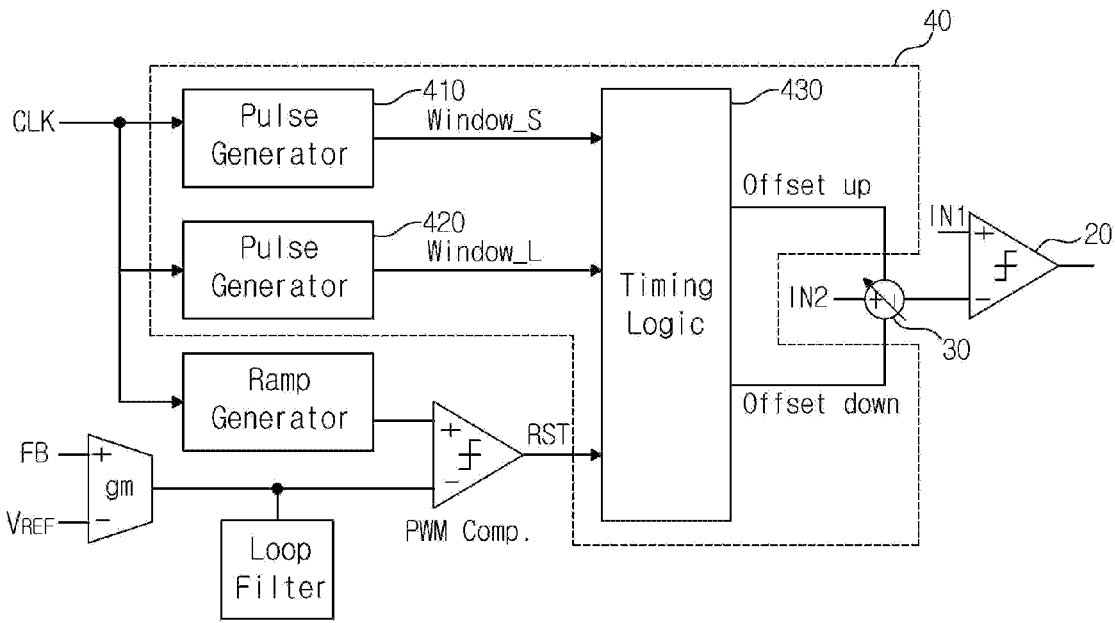
FIG. 6 is a diagram exemplarily illustrating a negative current tracking controller in exemplary embodiments of the present disclosure.

FIG. 1 is a diagram illustrating a general buck-type synchronous switching converter, FIG. 3 is a diagram illustrating a buck-type switching converter equipped with a negative current tracking control function in accordance with a first exemplary embodiment of the present disclosure, FIG. 5 is a diagram for describing the principle of inductor current and zero current detection of a buck-type switching converter, and FIG. 6 is a diagram exemplarily illustrating a negative current tracking controller 40 in the buck-type switching converter equipped with the negative current tracking control function in accordance with the first exemplary embodiment of the present disclosure.

The difference between the general buck-type synchronous switching converter illustrated in FIG. 1 and the buck-type switching converter equipped with the negative current tracking control function illustrated in FIG. 3 according to the first exemplary embodiment of the present disclosure is the negative current tracking controller 40 that variably adjusts an offset 30 of a zero current detector 20, and the remaining components are the same. Therefore, in the following, description will be made by focusing on the first exemplary embodiment of the present disclosure.

Referring to FIGS. 3, 5, and 6, the buck-type switching converter equipped with the negative current tracking control function according to the first exemplary embodiment of the present disclosure is configured to include a switching transistor M1, a rectifying transistor M2, an inductor L, an output capacitor Cout, a PWM controller 10, the zero current detector 20, and the negative current tracking controller 40.

A drain of the switching transistor M1 is connected to an input power supply, and a source of the switching transistor M1 is commonly connected to a drain of the rectifying transistor M2 and one end of the inductor.

A drain of the rectifier transistor M2 is connected to the source of the switching transistor M1, and a source of the rectifier transistor M2 is connected to the ground.

The one end of the inductor L is commonly connected to the source of the switching transistor M1 and the drain of the rectifying transistor M2, and the other end of the inductor L is connected to one end of the output capacitor Cout.

The one end of the output capacitor Cout is connected to the other end of the inductor L, and the other end of the output capacitor Cout is connected to the ground.

The PWM controller 10 outputs a PWM control signal to a gate of the switching transistor M1 and a gate of the rectifying transistor M2.

Reference numeral D1 indicates a switching driver that drives the switching transistor M1 according to the PWM control signal output by the PWM controller 10, and reference numeral D2 indicates a rectifying driver that drives the rectifying transistor M2 according to the PWM control signal output by the PWM controller 10.

The zero current detector 20 detects zero crossing of the inductor current flowing through the inductor L.

According to one or more embodiments shown in FIG. 5, in section 1 where the switching transistor M1 is turned on, the inductor current rises and the switching transistor M1 is turned off, in section 2 where the switching transistor M2 is turned on, the inductor current falls, and in this section, zero crossing of the inductor current may occur depending on the turn-on time of the rectifier transistor M2. In section 3 where both the switching transistor M1 and the rectifying transistor M2 are turned off, a body diode of the switching transistor M1 is turned on, and the inductor current flows through the body diode of the switching transistor M1.

The negative current tracking controller 40 variably adjusts the offset 30 of the zero current detector 20.

According to one or more embodiments shown in FIG. 6, the negative current tracking controller 40 may be configured to include a first pulse generator 410, a second pulse generator 420, and a timing controller 430.

The first pulse generator 410 generates a first pulse having a first time window according to an input clock.

The second pulse generator 420 generates a second pulse having a second time window larger than the first time window according to the input clock.

The timing controller 430 tracks the negative inductor current by determining whether or not to increase or decrease the offset of the negative inductor current flowing through the inductor L by monitoring a reset signal input from the PWM controller, comparing the first time window of the first pulse generated by the first pulse generator 410 and the second time window of the second pulse generated by the second pulse generator 420, and variably changing the offset 30 applied to an inverting terminal of the zero current detector 20.

In the following, referring further to FIGS. 7 to 13, a specific operation of the negative current tracking controller 40 applied to the first exemplary embodiment of the present disclosure will be described.

Figure 10:
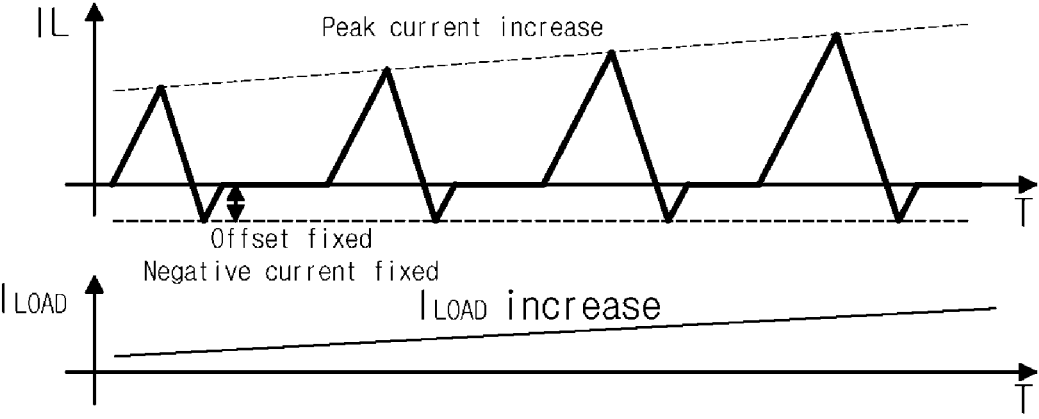
Figure 11:
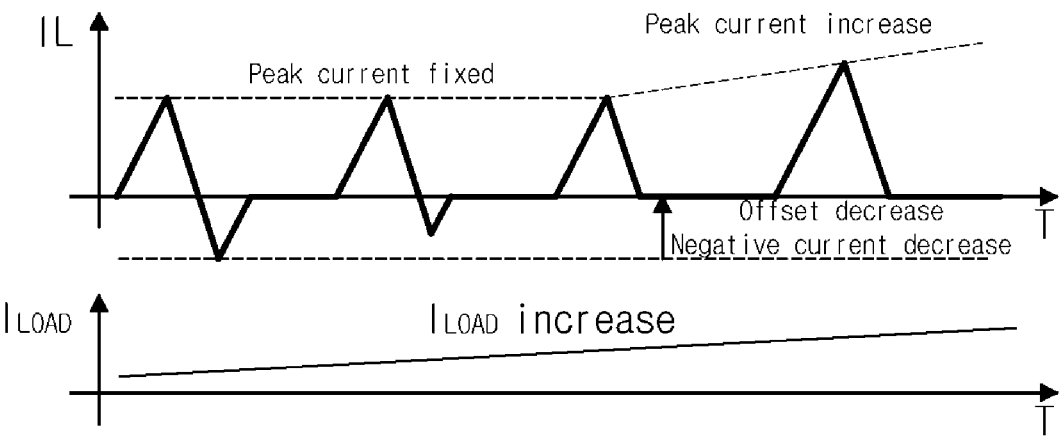
Figure 12:
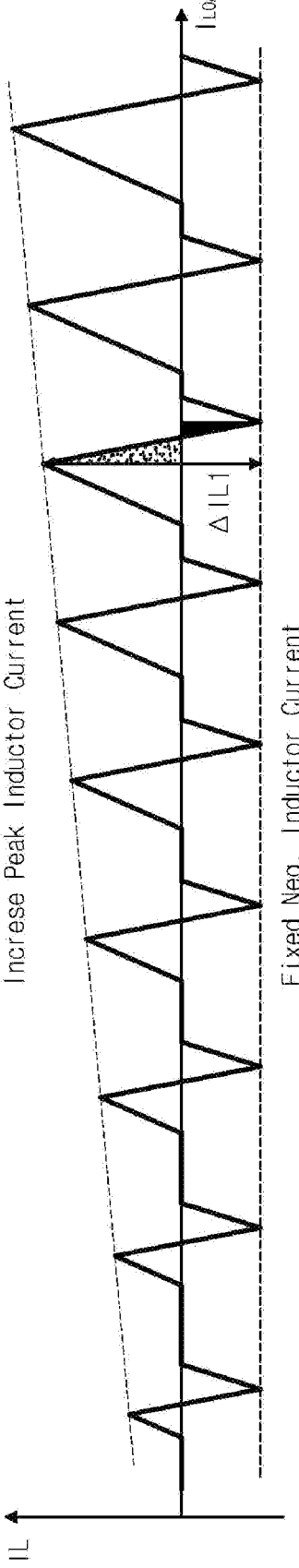
FIG. 12 is a diagram for describing inductor current characteristics of a general switching converter using fixed negative inductor current.
Figure 13:
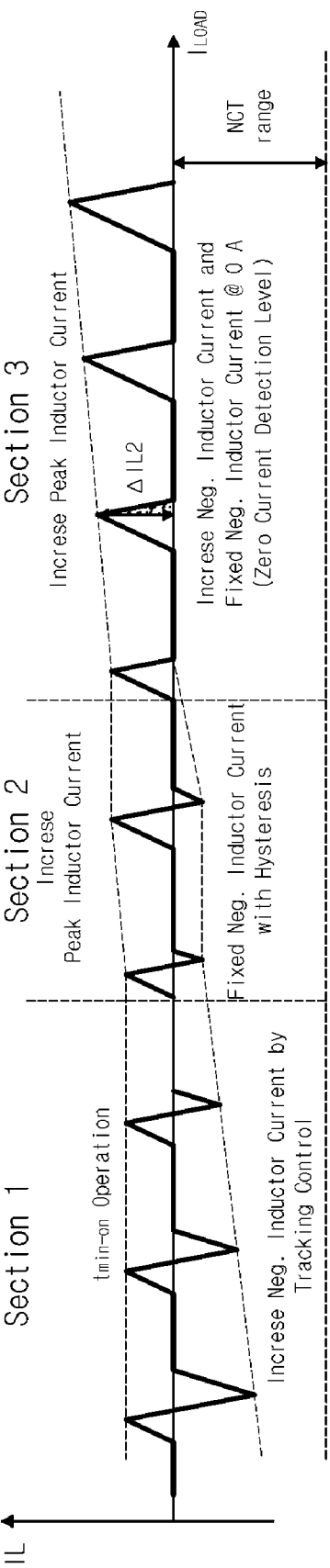
FIG. 13 is a diagram for describing inductor current characteristics of the switching converter in accordance with the exemplary embodiments of the present disclosure equipped with a negative inductor current tracking control function.

FIGS. 7 and 8 are diagrams for describing an operation method of the negative current tracking controller in the exemplary embodiments of the present disclosure, FIGS. 9 to 11 are diagrams for describing a correlation between the inductor current and load current according to negative current tracking control for each operation section in the first exemplary embodiment of the present disclosure, FIG. 12 is a diagram for describing inductor current characteristics of the general switching converter using fixed negative inductor current, and FIG. 13 is a diagram for describing inductor current characteristics of the switching converter according to the second exemplary embodiment of the present disclosure equipped with the negative inductor current tracking control function.

According to one or more embodiments shown in FIGS. 7 to 13, the timing controller 430 may be configured to increase the offset 30 applied to the inverting terminal of the zero current detector 20 during a first section corresponding to the first time window. During the first section corresponding to the first time window, a peak current of the inductor may be fixed and the negative inductor current increases.

One or more embodiments are described in more detail as follows.

FIG. 9 is a diagram illustrating that the peak current of the inductor is fixed while the load current decreases, and a reset signal RST by PWM output from the PWM controller 10 occurs in section 1 of FIG. 7 and the negative inductor current increases as the offset 30 increases. When the load current decreases, switch turn-on time 1 in FIG. 5, that is, the time at which the switching transistor M1 in FIG. 3 is turned on, decreases, and the switching converter enters section 1 by the timing controller 430. At this time, the timing controller 430 performs an offset up operation, and the offset up operation is an operation in which the timing controller 430 increases the offset 30 applied to the zero current detector 20. By the offset up operation performed by the timing controller 430, the zero current detector 20 detects the negative inductor current at a level lower than the zero current.

In one or more embodiments, the timing controller 430 may be configured to fix the offset 30 applied to the inverting terminal of the zero current detector 20 during a second section corresponding to the second time window.

During the second section corresponding to the second time window, the peak current of the inductor may be determined by the PWM by the PWM controller 10, and the negative inductor current is fixed.

FIG. 10 is a diagram illustrating that the negative inductor current is fixed when the load current increases in the state of section 1, and the reset signal RST by the PWM output by the PWM controller 10 occurs in section 2 of FIG. 7 and the offset 30 does not increase or decrease, but only the peak current of the inductor increases while maintaining the current negative inductor current. When the load current increases, the switch turn-on time 1 in FIG. 5, that is, the time at which the switching transistor M1 in FIG. 3 is turned on, increases, and the switching converter enters section 2 by the timing controller 430. At this time, the timing controller 430 does not perform the offset up operation or an offset down operation, and the size of the offset 30 applied to the zero current detector 20 does not change. Accordingly, while the offset 30 just before entering section 2 is maintained, the zero current detector 20 detects the negative inductor current at a level lower than the zero current or at the zero current level, and only the peak current increases.

In one or more embodiments, the timing controller 430 may be configured to decrease the offset 30 applied to the inverting terminal of the zero current detector 20 during a third section after the second time window.

During the third section, the peak current of the inductor may be determined by the PWM by the PWM controller 10, and the negative inductor current decreases.

FIG. 11 is a diagram illustrating that the reset signal RST by the PWM output from the PWM controller 10 enters section 3 from section 2 in FIG. 7 as the load current increases, the negative inductor current decreases and reaches to the zero current while the offset 30 decreases, and then the peak current of the inductor increases. When the load current increases, the switch turn-on time 1 in FIG. 5, that is, the time at which the switching transistor M1 in FIG. 3 is turned on, increases, and the switching converter enters section 3 from section 2 by the timing controller 430. At this time, the timing controller 430 performs the offset down operation. The offset down operation is an operation in which the timing controller 430 decreases the offset 30 applied to the zero current detector 20, and the negative inductor current is decreased by the offset down operation performed by the timing controller 430. When the offset 30 input to the zero current detector 20 becomes zero, the negative inductor current does not occur, and from then on, the peak current of the inductor rises as the load current increases.

Figure 2:
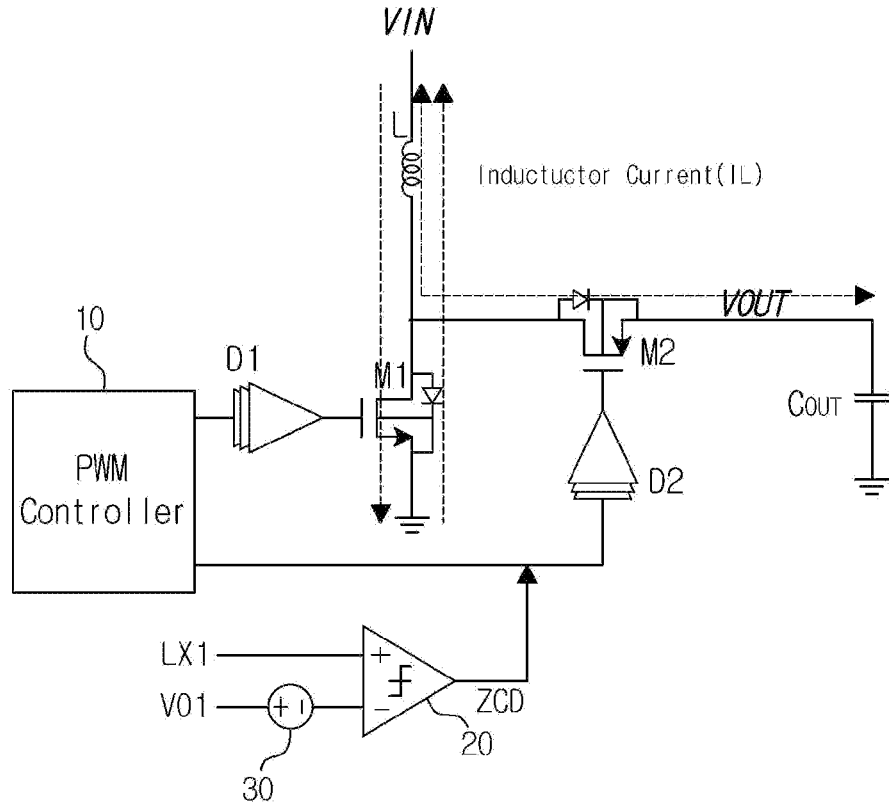
FIG. 2 is a diagram illustrating a general boost-type synchronous switching converter.
Figure 4:
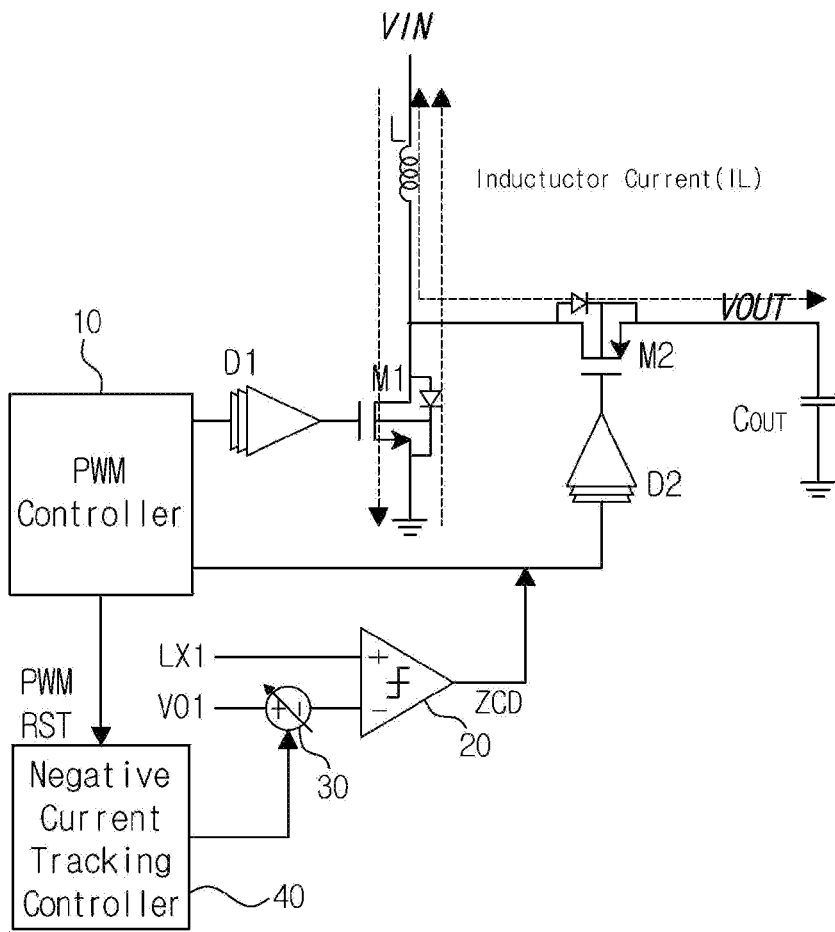
FIG. 4 is a diagram illustrating a boost-type switching converter equipped with a negative current tracking control function in accordance with a second exemplary embodiment of the present disclosure.

FIG. 2 is a diagram illustrating a general boost-type synchronous switching converter, FIG. 4 is a diagram illustrating a boost-type switching converter equipped with the negative current tracking control function according to the second exemplary embodiment of the present disclosure, FIG. 5 is a diagram for describing the principle of inductor current and zero current detection of a boost-type switching converter, and FIG. 6 is a diagram exemplarily illustrating the negative current tracking controller 40 in the boost-type switching converter equipped with the negative current tracking control function according to the second exemplary embodiment of the present disclosure.

The difference between the general boost-type synchronous switching converter illustrated in FIG. 2 and the boost-type switching converter equipped with the negative current tracking control function illustrated in FIG. 4 according to a second exemplary embodiment of the present disclosure is the negative current tracking controller 40 that variably adjusts the offset 30 of the zero current detector 20, and the remaining components are the same. Therefore, in the following, description will be made by focusing on the second exemplary embodiment of the present disclosure.

Referring to FIGS. 4, 5, and 6, the boost-type switching converter equipped with the negative current tracking control function according to the second exemplary embodiment of the present disclosure is configured to include an inductor L, a switching transistor M1, a rectifying transistor M2, an output capacitor Cout, a PWM controller 10, a zero current detector 20, and a negative current tracking controller 40.

One end of the inductor L is connected to an input power supply, and the other end of the inductor L is commonly connected to a drain of the switching transistor M1 and a drain of the rectifying transistor M2.

The drain of the switching transistor M1 is commonly connected to the other end of the inductor L and the drain of the rectifying transistor M2, and a source of the switching transistor M1 is connected to the ground.

The drain of the rectifying transistor M2 is commonly connected to the drain of the switching transistor M1 and the other end of the inductor L, and the source of the rectifying transistor M2 is connected to one end of the output capacitor Cout.

The one end of the output capacitor Cout is connected to the source of the rectifier transistor M2, and the other end of the output capacitor Cout is connected to the ground.

The PWM controller 10 outputs a PWM control signal to a gate of the switching transistor M1 and a gate of the rectifying transistor M2.

Reference numeral D1 indicates a switching driver that drives the switching transistor M1 according to the PWM control signal output by the PWM controller 10, and reference numeral D2 indicates a rectifying driver that drives the rectifying transistor M2 according to the PWM control signal output by the PWM controller 10.

The zero current detector 20 detects zero crossing of the inductor current flowing through the inductor L.

According to one or more embodiments shown in FIG. 5, in section 1 where the switching transistor M1 is turned on, the inductor current rises and the switching transistor M1 is turned off, and in section 2 where the switching transistor M2 is turned on, the inductor current falls, and in this section, zero crossing of the inductor current may occur depending on the turn-on time of the rectifier transistor M2. In section 3 where both the switching transistor M1 and the rectifying transistor M2 are turned off, a body diode of the switching transistor M1 is turned on, and the inductor current flows through the body diode of the switching transistor M1.

The negative current tracking controller 40 variably adjusts the offset 30 of the zero current detector 20.

According to one or more embodiments shown in FIG. 6, the negative current tracking controller 40 may be configured to include a first pulse generator 410, a second pulse generator 420, and a timing controller 430.

The first pulse generator 410 generates a first pulse having a first time window according to an input clock.

The second pulse generator 420 generates a second pulse having a second time window larger than the first time window according to the input clock.

The timing controller 430 tracks the negative inductor current by determining whether or not to increase or decrease the offset of the negative inductor current flowing through the inductor L by monitoring a reset signal input from the PWM controller, comparing the first time window of the first pulse generated by the first pulse generator 410 and the second time window of the second pulse generated by the second pulse generator 420, and variably changing the offset 30 applied to an inverting terminal of the zero current detector 20.

In the following, referring further to FIGS. 7 to 13, a specific operation of the negative current tracking controller 40 applied to the second exemplary embodiment of the present disclosure will be described.

FIGS. 7 and 8 are diagrams for describing an operation method of the negative current tracking controller in the second exemplary embodiment of the present disclosure, FIGS. 9 to 11 are diagrams for describing a correlation between the inductor current and the load current according to negative current tracking control for each operation section in the second exemplary embodiment of the present disclosure, FIG. 12 is a diagram for describing inductor current characteristics of the general switching converter using fixed negative inductor current, and FIG. 13 is a diagram for describing inductor current characteristics of the switching converter according to the second exemplary embodiment of the present disclosure equipped with the negative inductor current tracking control function.

According to one or more embodiments shown in FIGS. 7 to 13, the timing controller 430 may be configured to increase the offset 30 applied to the inverting terminal of the zero current detector 20 during a first section corresponding to the first time window. During the first section corresponding to the first time window, a peak current of the inductor may be fixed and the negative inductor current increases.

One or more embodiments are described in more detail as follows.

FIG. 9 is a diagram illustrating that the peak current of the inductor is fixed while the load current decreases, and a reset signal RST by PWM output from the PWM controller 10 occurs in section 1 of FIG. 7 and the negative inductor current increases as the offset 30 increases. When the load current decreases, switch turn-on time 1 in FIG. 5, that is, the time at which the switching transistor M1 in FIG. 3 is turned on, decreases, and the switching converter enters section 1 by the timing controller 430. At this time, the timing controller 430 performs an offset up operation, and the offset up operation is an operation in which the timing controller 430 increases the offset 30 applied to the zero current detector 20. By the offset up operation performed by the timing controller 430, the zero current detector 20 detects the negative inductor current at a level lower than the zero current.

In one or more embodiments, the timing controller 430 may be configured to fix the offset 30 applied to the inverting terminal of the zero current detector 20 during a second section corresponding to the second time window. During the second section corresponding to the second time window, the peak current of the inductor may be determined by the PWM by the PWM controller 10, and the negative inductor current is fixed.

One or more embodiments are described in more detail as follows.

FIG. 10 is a diagram illustrating that the negative inductor current is fixed when the load current increases in the state of section 1 and the reset signal RST by the PWM output from the PWM controller 10 occurs in section 2 of FIG. 7 and the offset 30 does not increase or decrease, but only the peak current of the inductor increases while maintaining the current negative inductor current. When the load current increases, the switch turn-on time 1 in FIG. 5, that is, the time at which the switching transistor M1 in FIG. 3 is turned on, increases, and the switching converter enters section 2 by the timing controller 430. At this time, the timing controller 430 does not perform the offset up operation or an offset down operation, and the size of the offset 30 applied to the zero current detector 20 does not change. Accordingly, while the offset 30 just before entering section 2 is maintained, the zero current detector 20 detects the negative inductor current at a level lower than the zero current or at the zero current level, and only the peak current increases.

In one or more embodiments, the timing controller 430 may be configured to decrease the offset 30 applied to the inverting terminal of the zero current detector 20 during a third section after the second time window. During the third section, the peak current of the inductor may be determined by the PWM by the PWM controller 10, and the negative inductor current decreases.

One or more embodiments are described in more detail as follows.

FIG. 11 is a diagram illustrating that the reset signal RST by the PWM output by the PWM controller 10 enters section 3 from section 2 in FIG. 7 as the load current increases, the negative inductor current decreases and reaches to the zero current while the offset 30 decreases, and then the peak current of the inductor increases. When the load current increases, the switch turn-on time 1 in FIG. 5, that is, the time at which the switching transistor M1 in FIG. 3 is turned on, increases, and the switching converter enters section 3 from section 2 by the timing controller 430. At this time, the timing controller 430 performs the offset down operation. The offset down operation is an operation in which the timing controller 430 decreases the offset 30 applied to the zero current detector 20, and the negative inductor current is decreased by the offset down operation performed by the timing controller 430. When the offset 30 input to the zero current detector 20 becomes zero, the negative inductor current does not occur, and from then on, the peak current of the inductor rises as the load current increases.

According to one or more embodiments of the present disclosure, as described in detail above, it is possible to improve efficiency of the switching converter by allowing negative inductor current and effectively controlling and minimizing the negative inductor current required for regulation in the no load and light load sections for the discontinuous conduction mode (DCM) driving operation of the switching converter.

Further, it is possible to improve the efficiency reduction, which is a disadvantage of the fixed negative inductor current DCM method, in applications sensitive to output ripple where the pulse skip function cannot be used.

Furthermore, it is possible to decrease inductor current ripple by applying the negative inductor current tracking control function that allows the minimum negative inductor current required for the DCM operation depending on the input/output voltage and improving the efficiency of the overall switching converter system.

More specifically, it is possible to allow the negative inductor current when the rectifying transistor M2 is turned on for output regulation in the no-load and light load DCM driving regions of the switching converter, and tracking the minimum negative inductor current required depending on the input voltage and load conditions.

Further, it is possible to improve efficiency of the switching converter through inductor conduction loss reduction and ac loss reduction by being able to decrease the inductor current ripple for the same load compared to a method that allows the fixed negative inductor current.

Although the switching converter equipped with the negative current tracking control function has been described with reference to the specific embodiments, it is not limited thereto. Therefore, it will be readily understood by those skilled in the art that various modifications and changes can be made thereto without departing from the spirit and scope of the present disclosure defined by the appended claims.

What is claimed is:

1. A switching converter, comprising:
   a switching transistor whose drain is connected to an input power supply;
   a rectifying transistor whose drain is connected to a source of the switching transistor and whose source is connected to a ground;
   an inductor having one end connected to the source of the switching transistor and the drain of the rectifying transistor;

an output capacitor having a first end connected to an other end of the inductor and a second end connected to a ground;

a PWM controller configured to output a PWM control signal to a gate of the switching transistor and a gate of the rectifying transistor;

a zero current detector configured to detect zero crossing of an inductor current flowing through the inductor; and a negative current tracking controller configured to variably adjust an offset of the zero current detector, wherein the negative current tracking controller is configured to increase the offset of the zero current detector when a load current decreases, such that the zero current detector detects the zero crossing when the inductor current is negative.

2. The switching converter of claim 1, wherein the negative current tracking controller includes:

a first pulse generator that generates a first pulse having a first time window according to an input clock, a second pulse generator that generates a second pulse having a second time window larger than the first time window according to the input clock, and a timing controller that tracks the negative inductor current by determining whether or not to increase or decrease an offset of the negative inductor current flowing through the inductor by monitoring a reset signal input from the PWM controller, comparing the first time window of the first pulse and the second time window of the second pulse, and variably changing an offset applied to an inverting terminal of the zero current detector.

3. The switching converter of claim 2, wherein the timing controller is configured to increase the offset applied to the inverting terminal of the zero current detector during a first section corresponding to the first time window.

4. The switching converter of claim 3, wherein during the first section corresponding to the first time window, a peak current of the inductor is fixed and the negative inductor current increases.

5. The switching converter of claim 3, wherein the timing controller is configured to fix the offset applied to the inverting terminal of the zero current detector during a second section corresponding to the second time window.

6. The switching converter of claim 5, wherein during the second section corresponding to the second time window, a peak current of the inductor is determined by PWM by the PWM controller, and the negative inductor current is fixed.

7. The switching converter of claim 5, wherein the timing controller is configured to decrease the offset applied to the inverting terminal of the zero current detector during a third section after the second time window.

8. The switching converter of claim 7, wherein during the third section, a peak current of the inductor is determined by the PWM by the PWM controller, and the negative inductor current decreases.

9. A switching converter, comprising:

an inductor having one end connected to an input power supply;

a switching transistor whose drain is connected to an other end of the inductor and whose source is connected to a ground;

a rectifying transistor whose drain is connected to the drain of the switching transistor and the other end of the inductor;

an output capacitor having a first end connected to a source of the rectifier transistor and a second end connected to a ground;

a PWM controller configured to output a PWM control signal to a gate of the switching transistor and a gate of the rectifying transistor;

a zero current detector configured to detect zero crossing of an inductor current flowing through the inductor; and a negative current tracking controller configured to variably adjust an offset of the zero current detector, wherein the negative current tracking controller is configured to increase the offset of the zero current detector when a load current decreases, such that the zero current detector detects the zero crossing when the inductor current is negative.

* * * * *